July 24, 1962 K. O. JOHNSON 3,045,937

WEB TENSION CONTROL

Filed Dec. 6, 1960

KEITH O. JOHNSON
INVENTOR

BY Nathan N. Kallman

ATTORNEY

1

3,045,937
WEB TENSION CONTROL

Keith O. Johnson, San Carlos, Calif., assignor to Ampex Corporation, Redwood City, Calif., a corporation of California Filed Dec. 6, 1960, Ser. No. 74,167
6 Claims. (Cl. 242—55.12)

Figure 1:
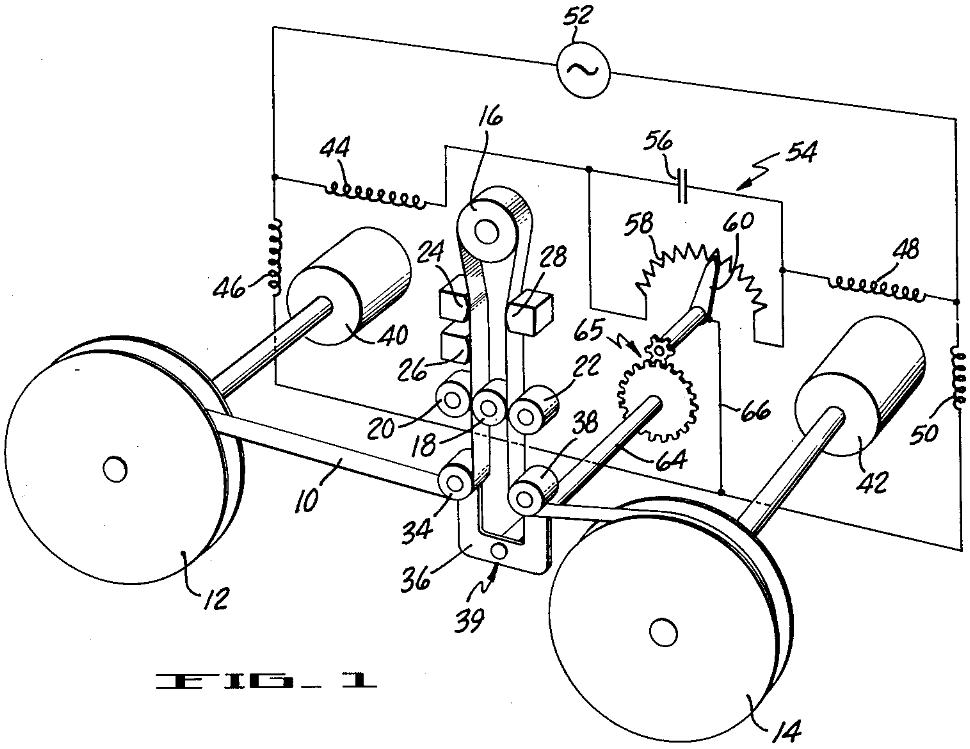

The present invention relates generally to magnetic recording apparatus and more particularly to means in such apparatus for controlling tension on a recording medium.

In magnetic recording apparatus, information is recorded on, and reproduced from a magnetic medium, such as a magnetic tape, by longitudinally moving the tape past record and reproduce heads. The tape is supported by a supply reel and a take-up reel and during recording or reproducing, the tape is unwound from the supply reel and is wound upon the take-up reel. The tape may be transferred by a rotating member called a capstan which, in cooperation with a pressure roller, applies traction to the tape.

A separate torque motor is generally employed to drive each reel. During recording and reproducing, the torque motor associated with the supply reel is arranged so as to exert a torque in a direction which opposes the unwinding of the tape therefrom. The torque motor associated with the take-up reel is arranged to exert a torque on the take-up reel in a direction such as to wind the tape on the reel as it is fed thereto by the capstan.

In order to record information on the tape and reproduce the same without distortion the tape is moved past the record and reproduce heads at a constant velocity. Instantaneous variations in tape velocity result in frequency modulation of the input signal (flutter).

Instantaneous variations in tape velocity may be caused by, for example, variations in tape tension between the supply reel and the capstan (input tape tension) and between the capstan and the take-up reel (output tape tension). Changes in the diameter and the mass of the tape on each reel as the tape is unwound from the supply reel and wound on the take-up reel cause a change in the speed at which the associated motor turns and also the load presented to the associated motor, and hence may result in variations in tape tension.

Normally, in previously available magnetic recording apparatus, the torque applied to the supply reel and the torque applied to the take-up reel have each been controlled so as to supply the tape to the capstan under a constant tension and to take up the tape from the capstan under a constant tension. Various devices have been used to control the applied torque including brakes, clutches, mechanical servo systems, etc.

In accordance with the present invention the total tension, that is, the sum of the output tape tension and the input tape tension, is maintained constant rather than the absolute values of the input and output tape tensions. This is accomplished by providing a separate split-phase motor for the supply reel and for the take-up reel, the power windings and the phase windings, respectively, of both motors being connected in series. Means are provided in the phase windings of the motors for simultaneously changing the phase shifts of the currents in the phase windings inversely with respect to each other. The phase-changing means is controlled by a means for determining the total tension on the recording medium so that the total tension on the medium is maintained substantially constant.

An object of the present invention is the provision of means in a recording apparatus for controlling the total tension on a recording medium.

Another object of the invention is the provision of

2 means in a magnetic tape apparatus for compensating for tape velocity changes caused by variations in the diameter and mass of rolls of tape employed in the apparatus.

A further object is the provision of means in a recording apparatus for controlling tension on a recording medium, which means is efficient and automatic in operation and is inexpensive and simple to manufacture.

Other objects and advantages of the present invention will become apparent by reference to the following description and accompanying drawings.

Figure 2:
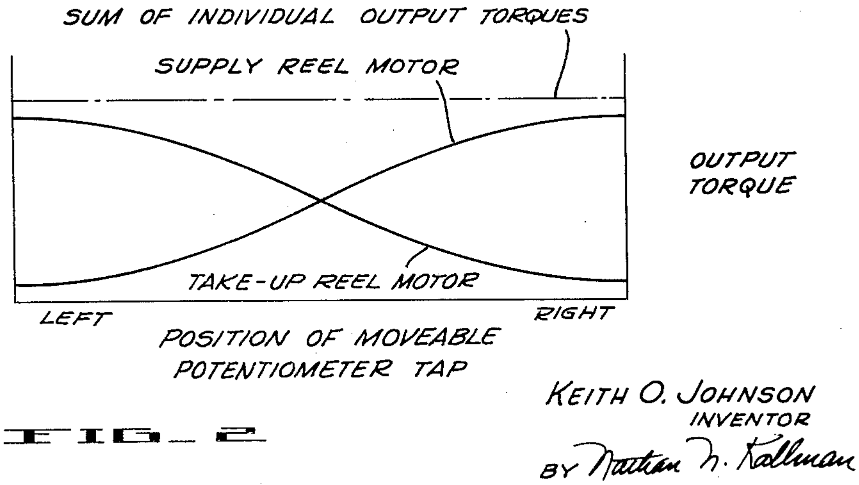

In the drawings:

FIGURE 1 is a schematic view of a magnetic recording apparatus in accordance with the present invention; and FIGURE 2 is a graph showing the relationship between the separate and total torques of the motors and the position of the potentiometer shown in FIGURE 1.

As shown in the drawings, means is provided in a magnetic recording apparatus for controlling the total tension on a longitudinally moving magnetic medium 10, such as a magnetic tape. The tape 10 is unwound from a supply reel 12 and is wound upon a take-up reel 14. The tape 10 extending between the supply reel 12 and the take-up reel 14 is looped about an idler roller 16. A capstan 18 which moves the tape along its path of travel is disposed intermediate the legs of the loop, the legs of the loop being pressed against the capstan 18 by a pair of solenoid operated pinch rollers 20 and 22.

The signal to be recorded is applied to a recording head assembly 24 disposed adjacent one leg of the loop of the tape 10 between the capstan 18 and the idler roller 16. An erase head 26 is disposed adjacent the tape 10 prior to its passage past the recording head assembly 24. The signal recorded on the tape is reproduced by a reproducing head assembly 28 disposed on the other leg of the loop between the capstan 18 and the idler roller 16. Guide rollers (not shown) may be provided adjacent the supply reel 12 and adjacent the take-up reel 14 to suitably guide the tape 10 in its passage through the recording apparatus.

As shown in FIGURE 1, between the supply reel 12 and the capstan 18, the tape 10 passes over a roller 34 carried by one end of a lever arm 36. The other end of the lever arm 36 also carries a roller 38, the tape passing over this roller in its travel between the capstan 18 and the take-up reel 14. The lever arm 36 and the rollers 34 and 38 carried thereby form part of a tension determining means 39, the purpose of which is explained hereinafter.

In the illustrated embodiment, the supply reel 12 and the take-up reel 14 are mechanically connected to split phase, induction type motors, 40 and 42, respectively. Both motors 40 and 42 have a power winding and a phase winding. The phase and power windings of the supply reel motor 40 are identified by the reference numerals 44 and 46, respectively, and the phase and power windings of the take-up reel motor 42 are identified by the reference numerals 48 and 50, respectively.

As shown in FIGURE 1, the power winding 46 of the supply reel motor 40 is connected to the power winding 50 of the take-up reel motor 42. The serially connected power windings 46 and 50 are connected to a source 52 of a single phase, alternating current power. One end of the phase winding 44 of the supply reel motor 40 is connected to the interconnection of the power source 52 and the power winding 46 of the supply reel motor 40. Likewise, one end of the phase winding 48 of the take-up reel motor 42 is connected to the interconnection between the power winding 50 of the take-up reel motor 42 and the power source 52.

The free ends of the two phase windings 44 and 48 are connected together by phase shifting means 54 which shifts the phase of the current in each of the phase windings 44 and 48 relative to the current in the associated power windings 46 and 50, respectively. As shown in FIGURE 1, the phase shifting means includes a capacitor 56 connected in parallel with a potentiometer 58, the tap 60 of the potentiometer 58 being connected to the interconnection between the power windings 46 and 50.

The position of the tap 60 of the potentiometer 58 is controlled by the means 39 for determining the total tension of the tape. In the illustrated embodiment, the tension-determining means 39 senses the difference in tension between the input tape tension and the output tape tension, which is related to the total tape tension. As shown in FIGURE 1 the tension-determining means 39 includes the lever arm 36 and the rollers 34 and 38 carried by the lever arm 36. Intermediate its ends, the lever arm 36 is fixedly connected to the end of a shaft 64. The other end of the shaft 64 is mechanically connected by means of gears 65, or other suitable means such as pulleys, to a shaft 66 of the potentiometer 58, which shaft 66 controls the position of the tap 60. The output tension of the tape 10 tends to rotate the tap 60 clockwise and the input tension tends to rotate the tap 60 counter-clockwise.

The position of the tap 60 determines the portion of the voltage developed across the capacitor 56 which appears in series with each phase winding voltage. The serially connected portion of the capacitor voltage and the phase winding voltage are connected in parallel with the associated power winding voltage, the phase and amplitude of which remain substantially constant. Hence, the phase and amplitude of the current through the phase winding is such that the vector sum of the phase winding voltage and the portion of the capacitor voltage in series therewith is equal to the associated power winding voltage.

Movement of the tap 60 varies the portion of the capacitor voltage which appears in series with each phase winding voltage. Increasing the portion of the capacitor voltage in series with one phase winding voltage decreases the portion in series with the other phase winding voltage. A change in the portion of capacitor voltage in series with each phase winding voltage results in a shift in the electrical phase angle between the current in the phase winding and the current in the associated power winding, and also results in a change in the magnitude of the current in the phase winding.

The output torque of each motor is approximately proportional to the currents in the power and phase windings and to the phase angle between these currents. Therefore, a change in the magnitude and phase angle of the current in the phase winding causes a corresponding change in the output torque of the motor. Since the phase angle and magnitude of the current in the phase winding decrease in one motor while the quantities increase in the other motor, motion of the tap causes the output torque of one motor to increase and the output torque of the other motor to decrease.

The resistance of the potentiometer is preferably made large compared to the reactance of the capacitor so that a minor amount of power is dissipated in the potentiometer, Hence, a relatively small wattage potentiometer may be employed. The capacitor is made large enough to shift the phase of the current in one of the phase windings by approximately 90 degrees relative to the associated power winding current.

A graph showing the output torque variations of the supply reel motor and take-up reel motor when controlled by the above described circuit is shown in FIGURE 2. As shown in FIGURE 2, the torque of the supply reel motor is decreased as the potentiometer tap is moved to the left and the torque of the take-up reel motor is increased. A resistance (not shown) may be connected in series with the phase windings to change the shape of the torque curve.

Since the torques of the motors are applied to the reels in opposite directions, the sum of the individual output torques of the motors provides, besides overcoming other factors such as friction, etc., the total tension on the tape. As shown in the graph, the total torque is almost constant for all positions of the potentiometer tap. Therefore, the tension on the tape remains approximately constant as the tap is moved.

In operation, a supply reel containing a full roll of tape, and an empty take-up reel are installed in the recording apparatus. Assuming that the potentiometer tap is almost fully counter-clockwise, when power is applied to the motors, a maximum torque is applied to the take-up reel and a minimum torque is applied to the supply reel. Since the load on the supply reel is at a maximum, and the load on the take-up reel is at a minimum, the output tape tension exceeds the input tape tension and the potentiometer tap is rotated clockwise, thereby increasing the torque on the supply reel and decreasing the torque on the take-up reel.

As the tape is unwound from the supply reel and wound upon the take-up reel less torque is required on the supply reel and more torque is required on the take-up reel in order to maintain the total tension constant. Any increase in the input tape tension or decrease in the output tape tension moves the tap on the potentiometer counter-clockwise to decrease the torque on the supply reel motor and increase the torque on the take-up reel motor.

Other means may be employed for determining the total tape tension than that described above. For example, the total tension may be determined by sensing the amount of tape left on one of the reels, by a timing device which indicates the elapsed time of tape transfer, etc.

The above described device may be combined with an appropriate switching system to cause the tape to be advanced at a rapid speed in a forward direction or to rewind the tape. This may be accomplished by opening the connection between the tap of the potentiometer and the power windings and then shunting the power winding of the supply reel motor to obtain fast forward operation or shunting the power winding of the take-up reel motor to obtain rewind operation. Direct current may be passed through the power windings to obtain a braking action.

It is understood that more than one potentiometer may be utilized to control the torques of the supply reel and take-up reel motors.

As can be seen from the above, means is provided in a recording apparatus for maintaining the total tension on the tape substantially constant. The device is inexpensive and simple to manufacture and is highly efficient.

Various changes and modifications may be made in the above described recording apparatus without deviating from the spirit or scope of the present invention. Various features of the present invention are set forth in the accompanying claims.

What is claimed is:

1. In recording apparatus, a pair of spaced reels, a recording medium extending between said reels, a capstan for moving said medium between said reels, a pair of split phase motors each of which is connected to one of said reels so as to apply a torque to that reel in a direction which tensions said medium, each of said motors having a pair of field windings, an alternating electrical power supply electrically connected to said windings, and means for varying the output torque of each of said motors, said means including phase shifting means electrically connected to said windings, for shifting the phase of the current in one field winding of each motor with respect to the current in the other field winding of the same motor, means connected to said phase-shifting means for controlling the phase shifts provided by the same, the phase shifts of the current in said one windings being changed inversely with respect to each other, means associated with said recording medium for determining the tension of the same, and means for connecting said determining means to said controlling means so as to vary the torque provided by each motor and thereby maintain the tension on the medium substantially constant.

2. In recording apparatus, a pair of spaced reels, a recording medium extending between said reels, a capstan for moving said medium between said reels, a pair of split phase motors each of which is connected to one of said reels so as to apply a torque to that reel in a direction which tensions said medium, each of said motors having a first field winding and a second field winding, said first field winding of each motor being electrically interconnected at one end thereof to one end of the second field winding of the same motor, the other ends of said first field windings being electrically interconnected, an alternating electrical power supply electrically connected across the serially connected first field windings, and means for varying the output torque of each of said motors, said means including phase shifting means electrically connected between said second field windings for shifting the phase of the current in the second field winding of each motor with respect to the current in the first field winding of the same motor, means connected to said phase-shifting means for changing the phase shifts provided by the same, the phase shifts of the currents in said second windings being changed inversely with respect to each other, means associated with said recording medium for determining the total tension of the same, and means connecting said determining means to said changing means so as to vary the torque provided by each motor and thereby maintain the total tension on the medium substantially constant.

3. In recording apparatus, a pair of spaced reels, a recording medium extending between said reels, a capstan for moving said medium between said reels, a pair of split phase motors each of which is connected to one of said reels so as to apply a torque to that reel in a direction which tensions said medium, each of said motors having a first field winding and a second field winding, said first field winding of each motor being electrically interconnected at one end thereof to one end of the second field winding of the same motor, the other ends of said first field windings being electrically interconnected, an alternating electrical power supply electrically connected across the serially connected first field windings, and means for varying the output torque of each of said motors, said means including a capacitor electrically connected between said second field windings, a potentiometer electrically connected in parallel with said capacitor, the movable tap of said potentiometer being electrically connected to the interconnection between said first windings, means associated with said recording medium for determining the total tension of the same, and means for mechanically connecting said determining means to said movable tap so as to vary the position of said tap, whereby the torque provided by each motor is varied to maintain the total tension on the medium substantially constant.

4. In recording apparatus, a pair of spaced reels, a magnetic tape extending between said reels, a capstan for moving said tape between said reels, a pair of split phase motors each of which is mechanically connected to one of said reels so as to apply a torque to that reel in a direction which tensions said tape, each of said motors having a first field winding and a second field winding, said first field winding of each motor being electrically interconnected at one end thereof to one end of the second field winding of the same motor, the other ends of said first field windings being electrically interconnected, an alternating electrical power supply electrically connected across the serially connected first field windings, and means for varying the output torque of each of said motors, said means including a capacitor electrically connected between said second field windings, a potentiometer electrically connected in parallel with said capacitor, the resistance of said potentiometer being much larger than the reactance of said capacitor, the movable tap of said potentiometer being electrically connected to the interconnection between said first windings, means associated with said tape for determining the total tension of the same, and means for mechanically connecting said determining means to said movable tap so as to vary the position of said tap whereby the torque provided by each motor is varied to maintain the total tension on the tape substantially constant.

5. In recording apparatus, a pair of spaced reels, a magnetic tape extending between said reels, a capstan for moving said tape between said reels, a pair of split phase motors each of which is mechanically connected to one of said reels so as to apply a torque to that reel in a direction which tensions said tape, each of said motors having a first field winding and a second field winding, said first field winding of each motor being electrically interconnected at one end thereof to one end of the second field winding of the same motor, the other ends of said first field windings being electrically interconnected, an alternating electrical power supply electrically connected across the serially connected first field windings, and means for varying the output torque of each of said motors, said means including a capacitor electrically connected between said second field windings, a potentiometer electrically connected in parallel with said capacitor, the resistance of said potentiometer being much larger than the reactance of said capacitor, the movable tap of said potentiometer being electrically connected to the interconnection between said first windings, means of measuring the difference between the tension of the tape extending from one reel to the capstan and the tension of the tape extending from the other reel to the capstan, and means for mechanically connecting said measuring means to said movable tap so as to vary the position of said tap in accordance with a change in the difference between the tensions whereby the torque provided by each motor is varied to maintain the total tension on the tape substantially constant.

6. A web driving apparatus comprising a pair of spaced reels for supply and take-up of said web, a pair of split phase motors each coupled to one of said reels for applying a torque to such reel so as to tension said web, each of said motors having a pair of field windings coupled thereto, said field windings being electrically interconnected, a source of alternating current for application to said windings, means for varying the output torque of each of said motors, said means including phase shifting means coupled to said field windings, and means coupled to said phase shifting means for controlling the phase shifts provided by said phase shifting means, said phase shift control means comprising a capacitance and a variable resistance means shunting said capacitance connected between said field windings, whereby varying the resistance of said variable resistance means changes the torque provided by each of said motors thereby maintaining the total tension on the web substantially constant.

References Cited in the file of this patent

UNITED STATES PATENTS

| | | |
|---|---|---|
| 2,656,129 | De Turk et al. | Oct. 20, 1953 |
| 2,726,049 | Crain | Dec. 6, 1955 |
| 2,904,275 | Selsted et al. | Sept. 15, 1959 |